US011086884B2

(12) United States Patent
Nohutcuoglu et al.

(10) Patent No.: US 11,086,884 B2
(45) Date of Patent: Aug. 10, 2021

(54) AUTOMATICALLY UPDATING A REMOTE DATABASE USING A CLIENT-SIDE WORD PROCESSOR

(71) Applicant: Microsoft Technology Licensing, LLC, Redmond, WA (US)

(72) Inventors: Baran S. Nohutcuoglu, San Francisco, CA (US); Vikram H. Patil, Belmont, CA (US); Luke Braud, Truckee, CA (US); Derek E. Lyons, El Cerrito, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 568 days.

(21) Appl. No.: 15/847,921

(22) Filed: Dec. 20, 2017

(65) Prior Publication Data
US 2019/0188301 A1    Jun. 20, 2019

(51) Int. Cl.
| G06F 16/9535 | (2019.01) |
| G06F 16/2457 | (2019.01) |
| G06F 3/0482 | (2013.01) |
| G06F 16/248 | (2019.01) |
| G06F 40/186 | (2020.01) |
| G06F 40/295 | (2020.01) |

(52) U.S. Cl.
CPC ...... *G06F 16/24575* (2019.01); *G06F 3/0482* (2013.01); *G06F 16/248* (2019.01); *G06F 16/9535* (2019.01); *G06F 40/186* (2020.01); *G06F 40/295* (2020.01)

(58) Field of Classification Search
CPC ...... G06F 16/38; G06F 16/93; G06F 16/9535; G06F 16/24575; G06F 3/0482; G06F 16/248; G06F 40/186; G06F 40/295
See application file for complete search history.

(56) References Cited

U.S. PATENT DOCUMENTS

| 2004/0049345 | A1* | 3/2004 | McDonough | G06Q 10/10 702/12 |
| 2012/0151411 | A1* | 6/2012 | Schwartz | G06F 16/90344 715/809 |
| 2014/0068404 | A1* | 3/2014 | Stiffler | G06F 40/174 715/227 |
| 2015/0193492 | A1* | 7/2015 | Gunaratne | G06F 40/166 707/609 |

(Continued)

*Primary Examiner* — Yuk Ting Choi
(74) *Attorney, Agent, or Firm* — Hickman Becker Bingham Ledesma LLP (57) ABSTRACT

Techniques for automatically updated a remote data source are provided. Multiple data type-field name pairs are received. The field names correspond to names of fields in a database system. In response to receiving first input, a text string is displayed on a screen of a client device that is remote relative to the database system. A portion of the text string is identified. A data type of the portion is determined. Based on the determined data type, a subset of the data type-field name pairs that share the data type is determined. One or more options, each corresponding to a field name in the subset, are displayed. In response to receiving second input that selects a particular option of the one or more options, the portion is stored in a particular field of a particular record of the database system, where the particular field corresponds to the particular option.

16 Claims, 8 Drawing Sheets

(56) References Cited

U.S. PATENT DOCUMENTS

2015/0237087 A1* 8/2015 Rekhi ................... G06Q 50/01
                                                          709/204
2018/0314765 A1* 11/2018 Zhao ..................... G06F 16/248
                                                          707/999.003

* cited by examiner

AUTOMATICALLY UPDATING A REMOTE DATABASE USING A CLIENT-SIDE WORD PROCESSOR

TECHNICAL FIELD

The present disclosure relates generally to network data transmission and data syncing and, more particularly, to creating intelligent text editors using metadata of remote data sources. SUGGESTED CLASSIFICATION: 709/201; SUGGESTED ART UNIT: 2447.

BACKGROUND

A database is an organized collection of data. Database designers typically organize the data to model aspects of reality in a way that supports processes requiring information. For example, in a customer relationship management (CRM) database may have record types for contacts, accounts, and opportunities. Each record type may include multiple fields for storing information pertaining to records of that type. For a contact record type, example fields include name, email address, phone number, job title, industry, and mailing address.

However, manually updating a database may be time consuming process, especially if multiple records need to be updated. For example, during a telephone call with multiple participants, a database user (i.e., with access to a CRM database) opens up a blank document provided by a word processor, such as Microsoft Word, and takes notes on the document. After the telephone call with multiple people, in order to keep the CRM database up-to-date with current and relevant information, the database user opens the database, searches on a name that the database user wrote down in an electronic document, selects a record that corresponds to one of the participants, selects a field within that record, and updates the field with the applicable information already recorded in the document. The person may select multiple fields of the record to update, and may repeat this process for all the participants on the telephone call. A similar process will be performed for any records of accounts and opportunities that were the subject of the telephone call.

Due to the labor-intensive nature of updating a database, many database users are dissuaded from doing so. Consequently, many databases records remain out-of-date and contain stale information, thus rendering the databases ineffectual for their intended purpose.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically updating a remote database using a word processor are provided. A word processor receives metadata of a remote database. Within a document that includes user-provided text, the word processor identifies text that is to be used to update the remote database. The word processor, using the metadata, displays one or more options of fields that are to be updated with the identified text. A user selects one of the options and, in response, the word processor sends, over a network, to a remote server, the identified text and the metadata associated with the selected option. In response, the remote server causes the remote database to be updated.

System Overview

Figure 1:
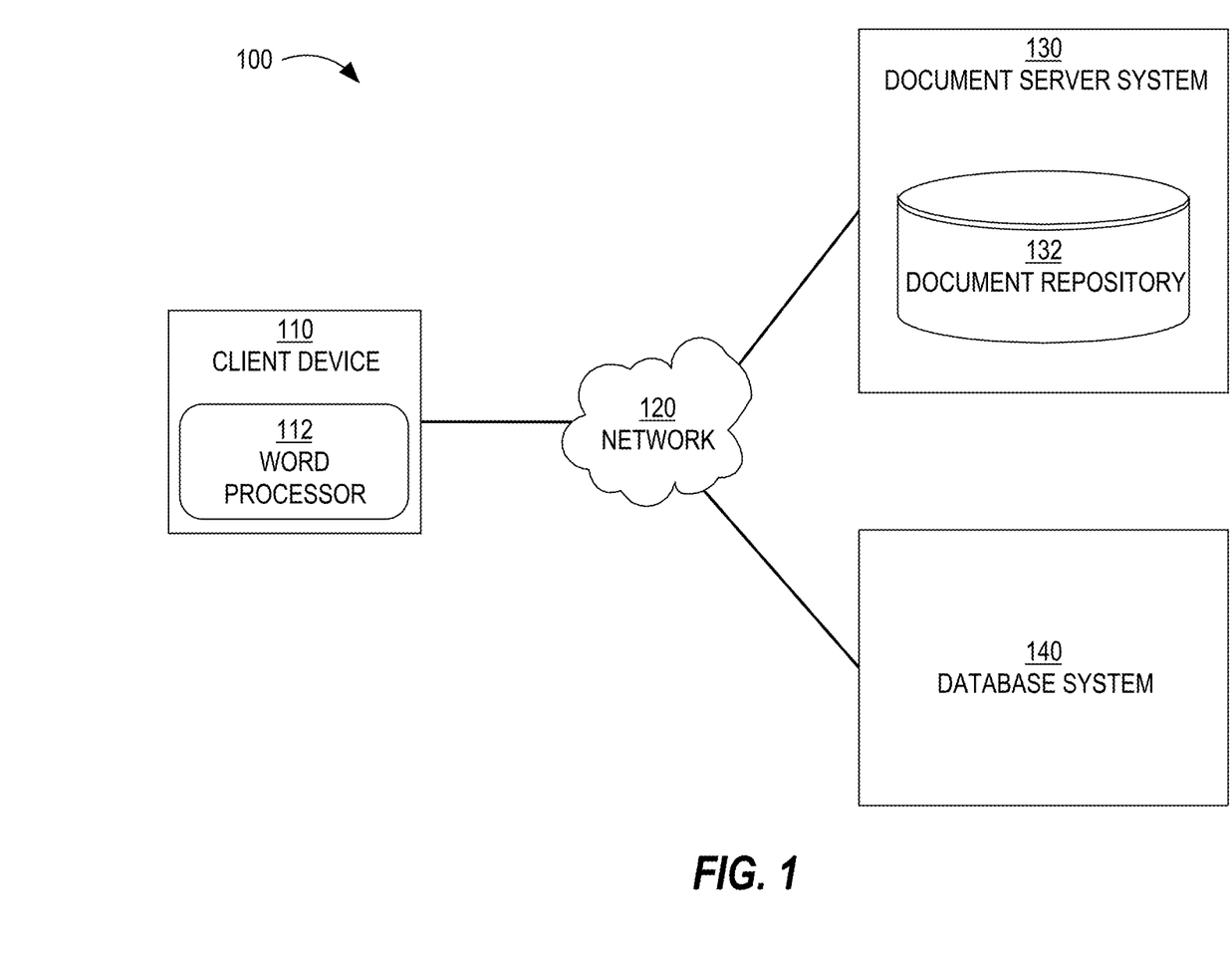
FIG. 1 is a block diagram that depicts an example system that comprises a client device, a network, a document server system, and a database system, in an embodiment.

FIG. 1 is a block diagram that depicts an example system 100 comprising a client device 110, a network 120, a document server system 130, and a database system 140, in an embodiment. Although one client device depicted, system 100 may include many client devices that are communicatively coupled to document server system 130.

Examples of client device 110 include a desktop computer, a laptop computer, a tablet computer, a wearable device, and a smartphone. Client device 110 includes a word processor 112 that allows users to enter text, delete text, and perform other operations with respect to entered text, such as saving the text, setting the style, size, and color of the font, indenting, creating bulleted lists, inserting tables, inserting images or other objects, numbering paragraphs, and so forth. Word processor 112 may also allow a user to create a new blank document, open up an existing document, and save a document.

Word processor 112 may be a web application that is retrieved from document server system 130 and presented through a web browser, such as Microsoft Internet Explorer and Mozilla Firefox. Alternatively, word processor 112 is a client-side application that is installed on client device 110 and is configured to communicate with document server system 130.

Word processor 112 is metadata-aware. A metadata-aware word processor is one that has access to metadata of database system 140. The metadata describes at least a portion of the data stored in database system 140. Word processor 112 receives the metadata from database system 140. The metadata comprises a plurality of field names and, for each field name, a data type of the corresponding field. Example data types include a number, an integer, a floating point number, a date (e.g., Nov. 22, 2017), a time (e.g., 23:10:23 or hours:minutes:seconds), a character array, a string (that includes at least one non-numeric character), and a list of items of one of the above data types.

For example, names of fields of a contact record type in database system 140 include First Name, Last Name, Phone Number, Email Address, Mailing Address, Employer Name, Job Title, Industry, Job Function, Geographic Region, and Notes. Example names of fields of an account record type include Account Name, Website URL, Phone Number, Mailing Address, and Notes. Example names of fields of an opportunity record type include Account Name, List of Contacts Associated with the Opportunity, Contact Roles, Sales Amount, Number of Widgets, Date Created, Initial Contact, Planned Closed Date, Next Step, Notes.

Network 120 may be implemented by any medium or mechanism that provides for the exchange of data between client device 110, document server system 130, and database system 140. Examples of network 120 include, without limitation, a network such as a Local Area Network (LAN), Wide Area Network (WAN), Ethernet or the Internet, or one or more terrestrial, satellite, or wireless links. Network 120 may include a combination of networks such as those described. Network 120 may transmit data according to Transmission Control Protocol (TCP) and Internet Protocol (IP)

Document server system 130 receives, from database system 140, metadata regarding data stored by database system 140. Document server system 130 transmits the metadata to client device 110 or a client device that causes data to be stored in database system 140.

In an embodiment, document server system 130 comprises a document repository 132 that stores multiple documents that client device 110 has created or edited and, optionally, other documents that other client devices (not depicted) have created or edited. Thus, a particular document may have been created based on input from one user and edited by many other users. A document may contain only the text that a user has entered or may also contain labeled data that the user has selected through a user interface provided by word processor 112.

For example, based on input from a user of client device 110, word processor 112 creates a blank document that is locally stored on client device 110. Word processor 112 creates a document identifier that uniquely identifies the document. Alternatively, word processor 112 communicates with document server system 130 to retrieve the document identifier. The user may also provide input that names the document. The user enters text (whether through keystrokes, touchscreen input, or using voice-to-text software) that is recorded in the document. The text may be formatted according to default formatting settings. Additionally, the user may provide input that modifies the default formatting settings for all or a portion of the text.

As another example, word processor 112 is part of a web application that provides an interface that displays information about multiple documents that are stored in document repository 132. The documents may have been created or modified by the user of client device 110 and/or by users of other client devices (not depicted). Based on input (from a user of client device 110) that selects one of the documents, the web application causes the selected document to be retrieved from document server system 130 and displayed on a screen of client device 110.

While a document is being edited, word processor 112 may cause the document (or at least the changes) to be stored persistently on client device 110 and/or transmitted over network 120 to document server system 130, which persistently stores the document and the changes made thereto.

Such incremental storing may be performed automatically "in the background," with or without notifying the user.

Each document stored in document repository 132 may be associated with certain data that associates the document with one or more records in database system 140. For example, in the CRM context, each document may be associated with an account, an opportunity, and one or more contacts or individuals. Because a single account may be associated with multiple opportunities, multiple documents may be associated with the same account. Also, because a single contact may be associated with multiple opportunities, multiple documents may be associated with the same contact.

Each document stored in document repository 132 may be stored with entity creation data that indicates an entity (user, group, or role) that initiated creation of the document. Each document may also be stored with entity update data that indicates one or more entities that have updated the document.

In an embodiment, database system 140 is a CRM system that comprises (1) persistent storage for storing records pertaining to accounts, opportunities, contacts, and/or products, (2) a user interface for visually displaying contents of the records and allowing users to manually create, delete, and update records, and (3) an API for allowing a remote system (e.g., document server system 130) to create, delete, and update records. Example vendors of CRM systems include Microsoft Dynamics, Salesforce, SAP, and Oracle.

Database system 140 is merely one type of data source that acts as a repository of stored data. An example of another type of data source includes a file system. Examples of database system 140 include a relational database, an object-relational database, an XML database, a NoSQL database, a NewSQL database, an in-memory database, and a cloud database. Additionally, database system 140 may comprise a single database or multiple databases representing disjoint data types.

Process Overview

Figure 2:
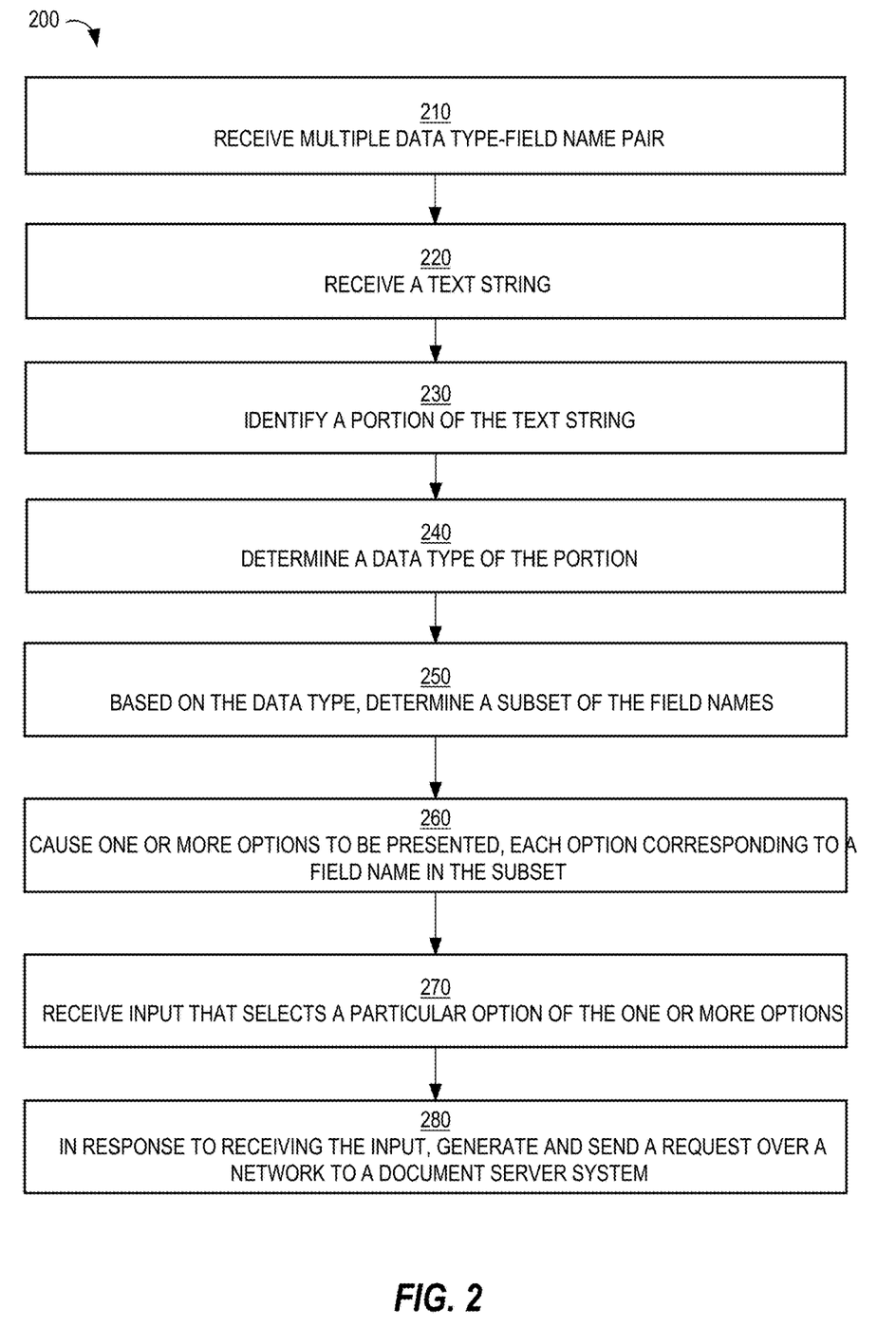
FIG. 2 is a flow diagram that depicts a process for automatically updating a remote data source using a word processor, in an embodiment.

FIG. 2 is a flow diagram that depicts a process 200 for automatically updating a remote data source using a word processor, in an embodiment. Process 200 may be performed by word processor 112 or by a client-side application that includes word processor 112.

At block 210, multiple data type-field name pairs are received. The field names correspond to names of fields in database system 140. The pairs may be received from document server system 130 in response to a request (e.g., from word processor 112) that identifies one or more attributes of a document, such as an account identifier that uniquely identifies an account, an opportunity identifier that uniquely identifies an opportunity among multiple opportunities associated with the account.

At block 220, a text string is received. The text string represents converted input from a user operating client device 110 and interfacing with word processor 112.

At block 230, a portion of the text string is identified. The portion may have been highlighted based on input from the user. Alternatively, the portion is identified automatically based on one or more other criteria, such as context surrounding the portion or based on the type of data. For example, if the portion comprises a sequence of numbers, then the numbers are identified.

At block 240, a data type of the portion is determined. Data types may include entities (such as a contact or an account) and/or primitives (such as number, string, currency, and date).

At block 250, based on the determined data type, a subset of the data type-field name pairs that share the data type is determined. Thus, any field names that are associated with the determined data type are determined. For example, if the determined data type is number, then field names associated with the number data type may include deal amount, expected revenue, sale price per widget, and number of widgets to be sold. As another example, if the determined data type is date, then field names associated with the date data type may include opening date, follow-up date, and closing date. As another example, if the determined data type is a string (of letters), then field names associates with the string data type may include next step, key competitor, industry, and note. As another example, if the determined data type is a person's name, then field names associates with the name data type may include Decision Maker, Subject Matter Expert, Key Contact, and Executive Helper.

At block 260, one or more options are presented to the user, each option indicating a different field name in the determined subset from block 250. If there are multiple options, then the options may be presented in a list form.

At block 270, input that selects a particular option of the one or more options is received. The input may be based on a user moving a cursor over the particular option and pressing a button on a mouse device. Alternatively, the input may be based on the user tapping a portion of a touchscreen that displays the particular option.

At block 280, in response to receiving the input, a request is generated and sent over network 120 to document server system 130. Document server system 130 causes the text portion to be stored in a particular field of a particular record of database system 140. The particular field corresponds to the particular option. Such causing may comprise document server system 130 generating a request that includes a record identifier (corresponding to the record or object that is being updated, which identifier is associated with the document when the document is created, since the document is created in the context of a particular record, such as a particular opportunity), a field name (corresponding to the particular option), and data value (corresponding to the identified text portion). In this way, when database system 140 receives the request, database system 140 knows which record and field to update.

In a related embodiment, instead of word processor 112 performing most (or all) of the above blocks, document server system 130 performs some those blocks, such as blocks 230-250. In this way, much of the intelligence in determining what options to display is offloaded from word processor 112 to document server system 130.

Identifying Text Portions

As noted previously in block 230, a text portion may be identified based on a user highlighting the text portion. Highlighting a text portion may involve pressing a button on a cursor device and, while holding down the button, moving the cursor across the text portion, and then letting go of the button. Another way to highlight a text portion is through a touchscreen display of a client device. Different applications or operating systems may allow a user to highlight text in different ways. For example, a user might hold her finger down over a portion of the touchscreen display for a period of time (e.g., 2 seconds), after which controls appear that include a left marker and a right marker. The user then moves each marker with her finger to highlight the desired text portion.

In an embodiment, a text portion and a data type for that text portion is automatically identified by word processor 112 (or by document server system 130). The text portion and the data type may be determined based on context (i.e., what other words or characters are adjacent to the text portion) and/or based on the text portion itself, such as the type and format of the characters. Examples of types of characters include number, letter, and non-alphanumeric character. For example, if a text string appears adjacent to (e.g., immediately after) a keyword, such as "Attendee" or "Participant", then it is determined that the text string is a name data type. As another example, if a text string is in a particular form (e.g., 3 numbers separated by a dash, period, or forward slash, such as "10-23-17") or includes a certain keyword (e.g., includes the name of a month), then it is determined that the text string is a date data type. As another example, each string of text (or pair of text strings) is extracted and searched against a database of names to determine if the text string(s) matches a name in the database. If there is a match, then it is determined that the text string is a name data type.

Example Document

FIGS. 3A-3E are screenshots that depict an example document 300 that is used to enter text, in an embodiment. Some of the text may have been entered by a user through a keyboard interface. Some of the text may have been generated using voice-to-text software that translates voice input (from the user and/or other users) into text that is displayed on a screen of client device.

Figure 3A:
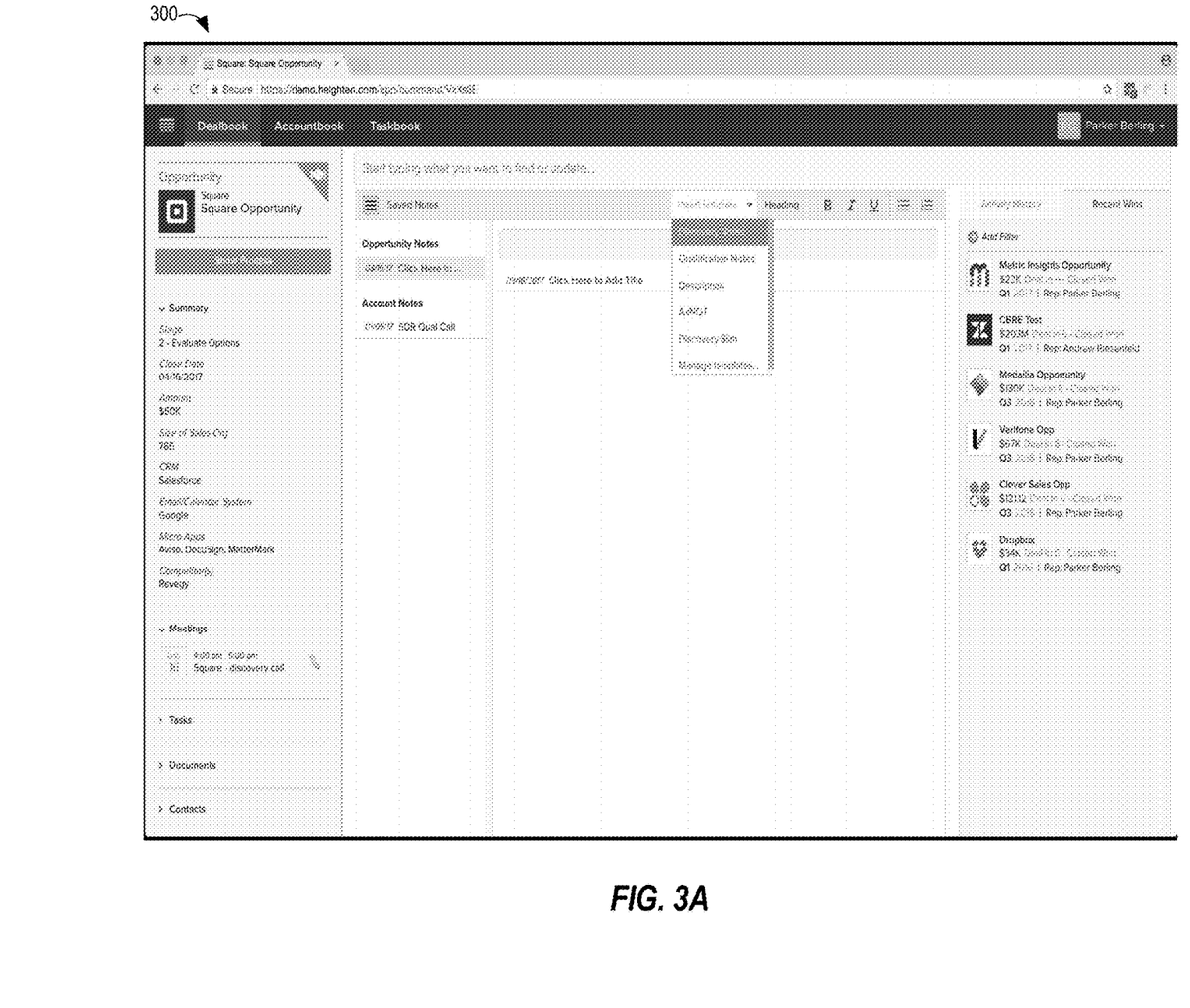
FIGS. 3A-3E are screenshots that depict an example document that is used to enter text, in an embodiment.

Some of the text in document 300 may have been generated based on a predefined document template. For example, a user of client device 110 may select, through an interface displayed by word processor 112, a document template that includes text, such as "Attendees", "Notes", and "Next Steps." As a result of the user's selection, document 300 includes such phrases in bolded text. Different templates may have different sets of text. In FIG. 3A, the selected document template is named "Discovery Notes." Other document templates may include "Qualification Notes," "Description," "AxNOT," and "Discovery Slim," where each template includes different text and/or a different format.

Existing Contacts

Figure 3B:
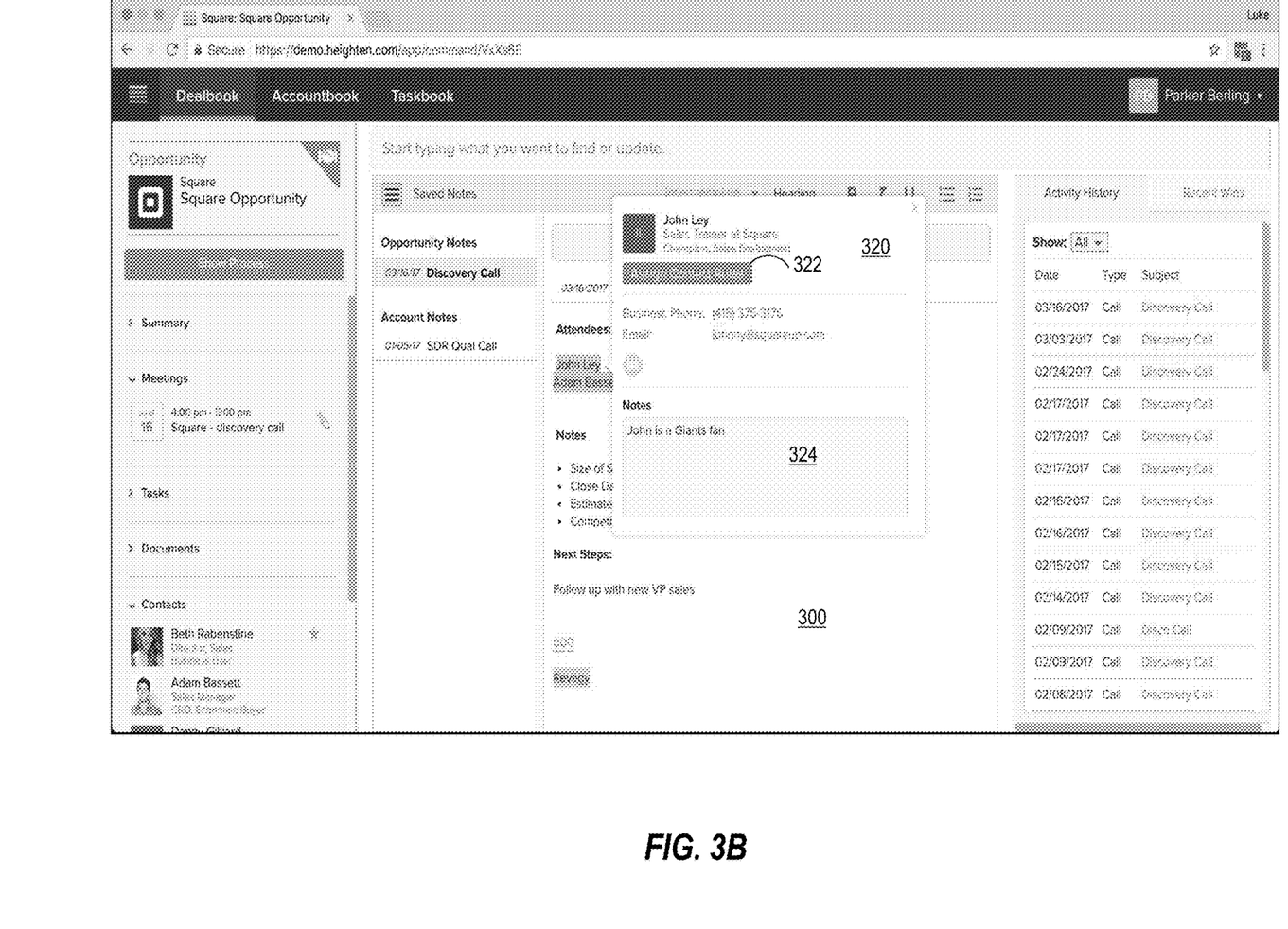

FIG. 3B is a screenshot of document 300 that includes an example contact interface 320 that is displayed in response to detection of one or more names. The detection of names may have been performed automatically by word processor 112 that identifies two sets of token pairs, each pair separated by a carriage return. The determination that the token pairs "John Ley" and "Adam Bassett" are names of people (or name data type) may be based on the fact that the token pairs are after the keyword "Attendees" and before the next keyword (i.e., "Notes" in this example). If the token pairs appeared after the keyword "Notes", then word processor 112 may have determined that each token pair is a "generic" string data type and would present options of fields names that are of the string data type.

Another way to determine that a text portion (i.e., set of one or more tokens) is a person's name is based on user input. For example, a user may select (e.g., using a cursor or touchscreen input) a set of tokens (e.g., a token pair) and, in response, word processor 112 displays an option that asks the user if the highlighted text corresponds to a person's name. If the option is selected (in the affirmative), then word processor 112 stores data indicating that the highlighted text is a person's name.

In response to determining that a text portion (e.g., "John Ley") is a name of a person, word processor 112 sends the set of tokens to document server system 130, which formulates a query against database system 140. The query includes the value "John Ley" and object or record type "Person" or "Contact", a defined data type in database system 140. Database system 140 generates a result and returns the result to document server system 130, which forwards the result (or a portion thereof) to word processor 112.

Another way to determine that a text portion is a person's name is by comparing different text portions to names of contacts that are associated (in database system 140) with a particular entity. For example, in the CRM context, document 300 may be created in the context of a particular opportunity that is associated with an account (or company) and one or more contacts. Names of contacts associated with the particular opportunity may be retrieved from database system 140 when document 300 is opened or in response to a request (from client device 110) to view of information about one or more opportunities (that includes the particular opportunity) is transmitted to database system 140. Thus, the comparing of a text portion with names of contacts may be performed on client device 110 and not all possible contact records in database system 140 need to be considered.

Contact interface 320 is generated in response to a determination that a positive result has been determined (i.e., at least one contact has been identified, whether by client device 110, document server system 130, or database system 140). Contact interface 320 indicates a job title of the contact "John Ley," a role of the contact ("Champion, Sales Enablement"), a business phone number of the contact, an email address of the contact, and notes pertaining to the contact. All this information is stored in a record in database system 140. Notes field 324 is a field where text may be added, deleted, or otherwise updated by the user of client device 110. Any updates to notes field 324 is (e.g., automatically) stored back to database system 140 (via network 120 and document server system 130). Any text in notes field 324 may override the corresponding text stored in database system 140.

In an embodiment, updating a database system 140 based on data that is entered through word processor 112 involves multiple devices. First, word processor 112 generates and sends, to document server system 130, a request that includes entity data, an identifier of a particular record of the contact type, a name of notes field 324, and a value. In the context of text entered into notes field 324, the value is a text value that comprises the contents of notes field 324.

The entity data indicates an identity of a user that initiated the creation, an identity of client device 110, a group to which the user belongs, or a role that the user has been assigned. For example, a user operating client device 110 logs into document server system 130 with certain credentials that may be associated with the user specifically, or with a particular group, and/or with a particular role. Thereafter, any changes or actions that the user performs or initiates relative to word processor 112 are accompanied by the entity data. The identity may be a unique identifier established by document server system 130 and stored at client device 110, at least when word processor 112 displays contents of a document (e.g., document 300). Thus, word processor 112 transmits not only updated data values and their corresponding field names, but also the entity data.

In response to receiving the request, document server system 130 forwards (or generates and sends a corresponding request), to database system 140, the request being in a format that database system 140 expects. Before forwarding (or in generating the corresponding request), document server system 130 may translate the name of notes field 324 into a field name that database system 140 recognizes (if word processor 112 processes a field name that has been mapped from a field name in database system 140). Also, for each update to database system 140, database system 140 may include the entity data and a timestamp of the update.

Contact interface 320 also includes a roles button 322 that, when selected, allows a user to assign a role to the contact. In this example, the contact already has one role assigned. A contact may have multiple roles assigned to him/her. The name of a role may be free text entered by the user or may be a pre-defined role that is selected from, for example, a drop-down menu. Example pre-defined roles include "Primary Contact", "2.0 Sales Leader", "Budget Owner", "Business User", "Champion", "CEO", "Decision Maker", "Economic Buyer", "Economic Decision Maker", "Evaluator", "Execution Sponsor", "Influencer", "Key Executive", "Legal", and "Partner Contact". A selected role may cause an update in database system 140 in a manner similar to the process described above for updating database system 140 based on updates to notes field 324.

In an embodiment, word processor 112 (or document server system 130) has access to calendar data. The calendar data may be of (a) a personal calendar of the user that is operating client device 110 or (b) a group calendar that includes meetings created by one or more other users. The calendar data may be stored locally on client device 110 and/or by document server system 130. For example, in response to creating document 300, word processor 112 accesses calendar data to determine a current date (or a date associated with document 300), identify a meeting that is/was scheduled for that date, and identify attendees or participants indicated in the meeting. Word processor 112 may use the attendee data to match against any text portions in document 300. If there is a match, then a search of database system 140 for contact records that have the same name as the text portions in the match is initiated. The search may be formulated by document server system 130. Alternatively, CRM contact data is sent to client device 110 and word processor 112 performs the search locally. (For some record types that are expected to be more limited in number, all records of one of those types may be loaded onto client device 110 so that the search is performed locally.) If the attendees are not mentioned in document 300, then word processor 112 may automatically enter the names of the attendees in document 300 and/or still initiate a search of database system 140.

Without embodiments herein related to updating an existing contact, a user would have to interact with database system 140 directly (requiring multiple clicks) and manually update multiple fields through a typically unfriendly user interface. With the embodiments related to updating an existing contact, a user is able to update database system 140 quickly and simply without having to interact directly with database system 140.

New Contacts

In an embodiment, word processor 112 determines that a contact that is referred to in a document (or in a calendar meeting) is not found in database system 140. This determination may be made by identifying one or more name tokens in a document (or calendar data) and sending the one or more name tokens over network 120 to document server system 130. Each name token corresponds to a consecutive series of characters. If there are multiple name tokens that are identified, then one name token may be a person's first name, another name token may be the person's last name, and, if there is a third name token, then that name token may be the person's middle name or maiden name.

If a result of a contact query of database system 140 is that no contact record was found based on one or more name tokens included in the contact query, then word processor 112 displays a new contact interface (not depicted) that includes multiple fields, such as a field for the person's first name, a field for the person's last name, a field for the person's job title, a field for the person's employer, a field for one or more roles of the person, a field for a phone number, a field for an email address, and a field for notes. The data entered into the fields of the new contact interface is transmitted over network 120 to document server system 130, which formulates a write request that includes the data and the corresponding field names and sends the write request to database system 140. In response to receiving the write request, database system 140 creates a new contact record and includes, in that new contact record, a data item for each field indicated in the write request. The transmission of the entered data from word processor 112 may be triggered by user selection of a save button that is displayed in the new contacts interface.

Without embodiments herein related to creating a new contact in database system 140, a user would have to interact with database system 140 directly (requiring many clicks) and manually entering data into multiple fields through a typically unfriendly user interface. With the embodiments related to creating a new contact, a user is able to cause a new contact record to be created in database system 140 quickly and simply without having to navigate (or interact directly with) database system 140.

Options Interface

Figure 3C:
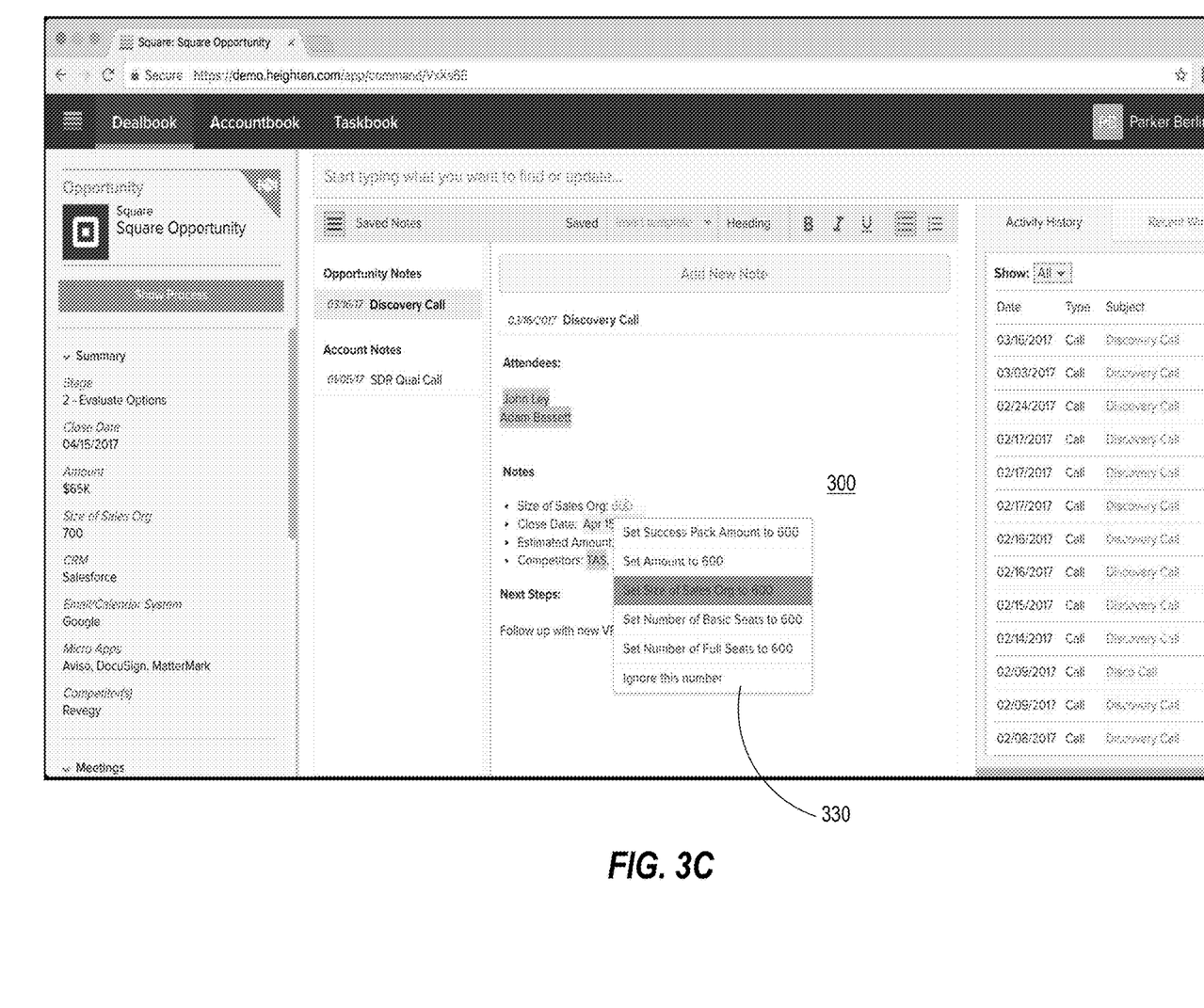

FIG. 3C is a screenshot of document 300 that includes an options interface 330, in an embodiment. Options interface 330 may be generated based on where a user's cursor is located. In this example, the user's cursor is located between the zeros of the number "600." As another example, options interface 330 is displayed after the number "600" is highlighted.

Alternatively, options interface 330 is displayed automatically without requiring any user input. For example, after a new contacts interface is displayed and disappears, word processor 112 identifies a next text portion to highlight.

Here, word processor 112 (or document server system 130) determines that the text portion "600" is a number data type. Accordingly, word processor 112 determines one or more fields that are associated with the number data type and displays those fields in options interface 330. Each option in options interface 330 invites the user to set a certain field in database system 140 to the selected text portion (i.e., "600" in this example). The field names in this example are "Success Pack Amount", "Amount", "Size of Sales Org", "Number of Basic Seats", and "Number of Full Seats."

If there are many fields of the number data type, then word processor 112 may select a subset of the field names to display. The subset may be based on previously-selected field names by the same user in the past, by other users in the same organization in the past, or by all users, regardless of organization. Additionally or alternatively, the selected subset of field names may be based on context of the identified text portion. Context may be text on the same line as the text portion or the nearest text that precedes and/or succeeds the identified text portion. In this example, the context of "600" may be the text that appears on the same line as "600" (i.e., "Size of Sales Org"). Word processor 112 may perform a match between the context and the field names. Word processor 112 may then select, for the subset, all field names that at least partially match the context. For example, if the context matches over 25% of a field name, then the field name is selected to be in the subset.

The subset of field names may be ordered based on a score that indicates a likelihood that each field name is the one that the user will select. An example score for a field name is a match score that indicates how much of the context matches the field name.

If word processor 112 has high confidence that a particular field name is correct (e.g., based on a score for that particular field name being above a particular threshold), then options interface 330 may only present that particular field name as an option. However, even then, options interface 330 may also include another button (or other selectable graphical element) (which may be entitled "More") that allows the user to view additional options, just in case the user wants to select a different field name.

Options interface 330 includes an option to "Ignore this number." Selecting this option may cause the corresponding text portion to be "un-highlighted," if already highlighted.

Figure 3D:
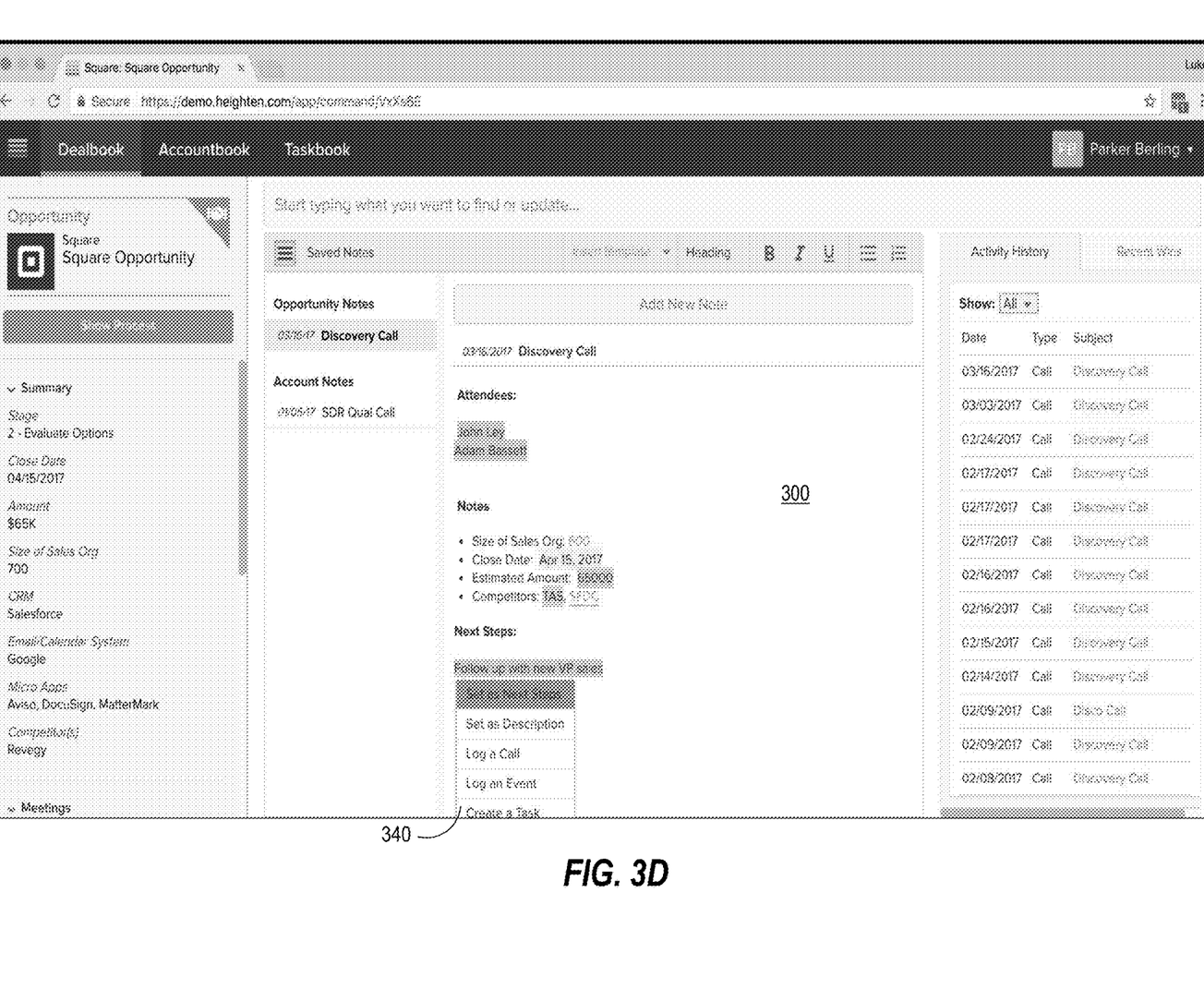

FIG. 3D is a screenshot of document 300 that includes an options interface 340, in an embodiment. Options interface 340 is similar in some respects to options interface 330. One difference is that the data type is a string data type as opposed to a number data type.

Options interface 340 may be generated based on user selection of the text portion "Follow up with new VP sales." Alternatively, options interface 340 is displayed automatically without requiring any user input. For example, after options interface 330 is displayed and disappears, word processor 112 identifies a next text portion to highlight.

Here, word processor 112 (or document server system 130) determines that the text portion "Follow up with new VP sales" is a string data type. Accordingly, word processor 112 determines one or more fields that are associated with the string data type and displays those fields in options interface 340. Each option in options interface 340 invites the user to set a certain field in database system 140 to the selected text portion (i.e., "Follow up with new VP sales" in this example), to log the selected text portion as a call or an event, or create a task. The two field names in this example are "Next Steps" and "Description." Calls, events, and tasks are examples of related records that can be attached to (or associated with) an opportunity type of record. "Attaching tasks to an opportunity" creates a history of a representative's communication activity on the deal corresponding to the opportunity.

If there are many fields of the string data type, then word processor 112 may select a subset of the field names to display. The subset may be based on previously-selected field names by the same user in the past, by other users in the same organization in the past, or by all users, regardless of organization. Additionally or alternatively, the selected subset of field names may be based on context of the identified text portion. Context may be text on the same line as the text portion or the nearest text that precedes and/or succeeds the identified text portion. In this example, the context of "Follow up with new VP sales" is text (i.e., "Next Steps") that appears on the closest previous line (e.g., of bolded text) to the selected text portion. Word processor 112 may perform a match between the context and the field names. Word processor 112 may then select, for the subset, all field names that at least partially match the context. For example, if the context matches over 33% of a field name, then the field name is selected to be in the subset.

In an embodiment, user selection of text portions causes options interface 340 to be displayed. In this embodiment, there is no determination of data type and comparison with data types from database system 140. Instead, user selection of a text portion is an indication that a user wants to create a note, log a call, or other similar action that involves saving a (e.g., large) chunk of text. For example, if the number of characters selected based on user input is over a particular threshold (e.g., 25), then it is presumed that the user is interested in a limited set of actions, such as setting a Next Steps field, setting a Description field, logging a call, logging an event, or creating a task.

Figure 3E:
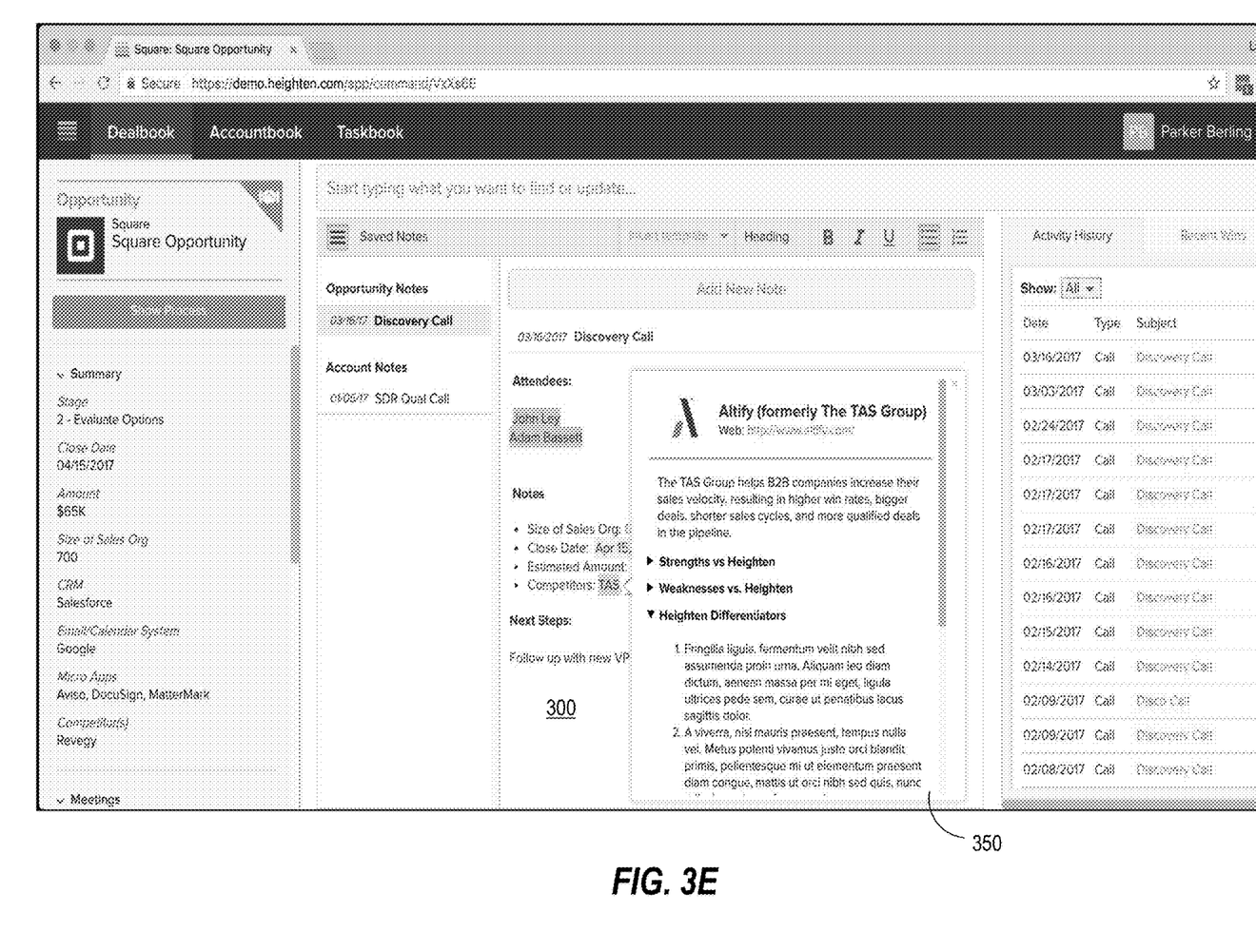

FIG. 3E is a screenshot of document 300 that includes an info box 350, in an embodiment. Info box 350 is displayed in response to detecting an organization name in the text of document 300. In this example, the identified text portion is "TAS" and the context of "TAS" is "Competitors." Based on the context (i.e., that tokens that follow the keyword "competitor" are associated with organizations), it is presumed that the identified text portion is of an organization and, accordingly, word processor 112 or document server system 130 performs a search, such as a web search, that includes "TAS" as the search token and, optionally, data that indicates that TAS is a company (e.g., "TAS company"). A result of the search is presented in info box 350.

Saving Documents

In an embodiment, a document is associated with markup data that indicates (1) which text portions in the document have been transmitted to database system 140 through an interface (e.g., contact interface 320, new contact interface, or options interface 330) and, optionally, (2) a field name for each of those text portions. The markup data is stored along with documents in document repository 132.

For example, in response to receiving (e.g., from client device 110 or another client device (not depicted)), a request to open a document, document server system 130 determines whether the requested document is associated with markup data. If so, then document server system 130 sends the markup data to the requesting client device, which uses the markup data to render a version of the document that visually indicates the text portions that have been previously highlighted (or otherwise identified) and used to update database system 140. The rendered document may also include a graphical element (e.g., a button or tag) adjacent to each identified text portion to indicate the field name (if applicable) that was updated in database system 140. Word processor 112 (or another instance thereof executing on another client device) may display such a graphical element whenever the corresponding text portion is displayed or only when user input is received relative to the corresponding text portion, such as when a user's cursor hovers over or near the corresponding text portion.

In an embodiment, if a document contains multiple identified text portions, then different identified text portions are highlighted or formatted differently. For example, each identified text portion may have a different background color. Alternatively, text portions corresponding to different data types may be highlighted differently. For example, text portions associated with the number data type may have a first background color and text portions associated with the string data type may have a second background color. The highlighting/formatting scheme used when field names of the text portions are initially established may be preserved when a document is saved to document server system 130 so that the same highlighting/formatting scheme may be used when the document is loaded again later (whether on the same client device or a different client device).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
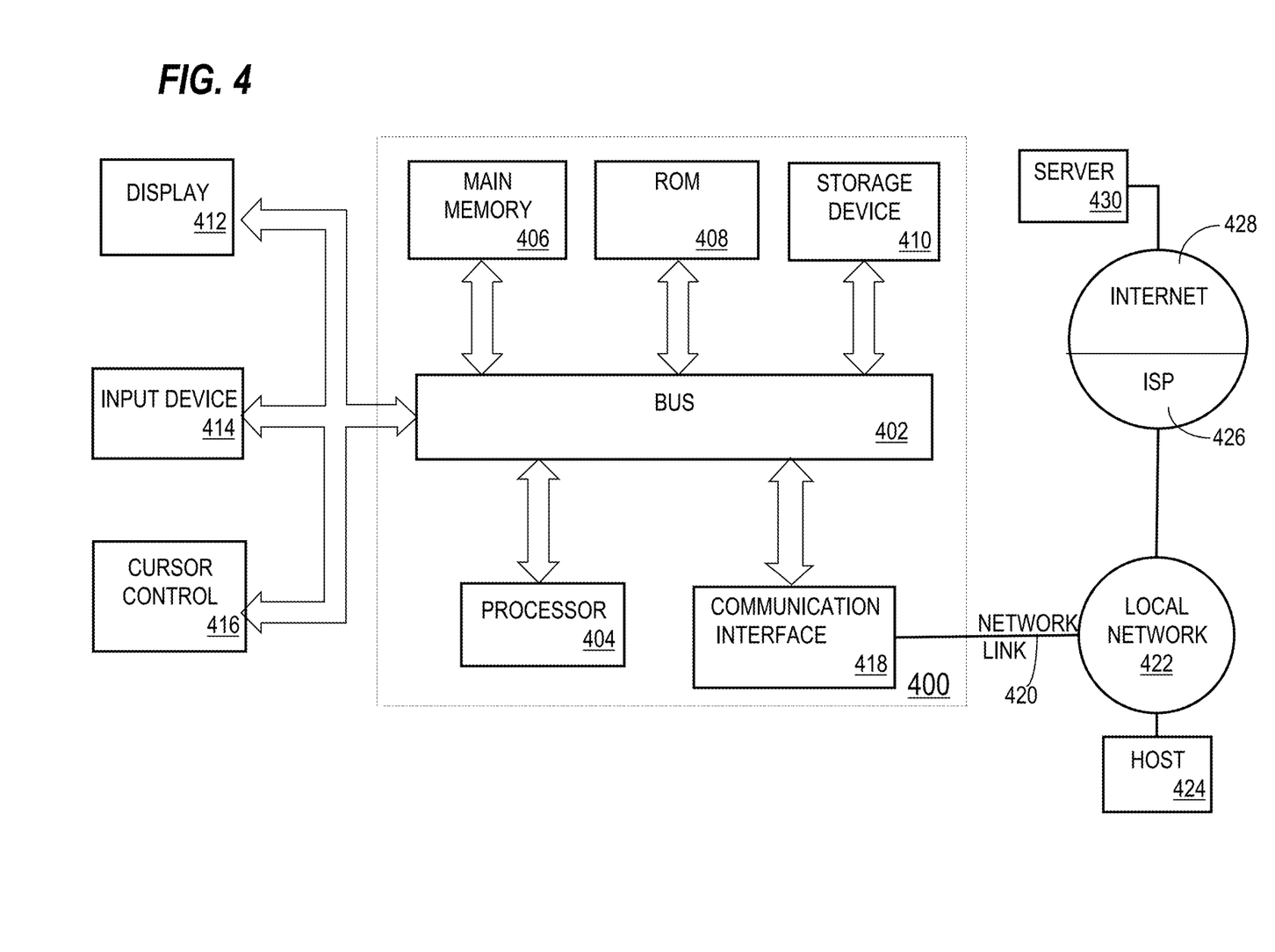
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause:
   receiving a plurality of field names, wherein the plurality of field names correspond to names of fields in a database system, wherein each field name in the plurality of field names is associated with a data type, wherein the plurality of field names include a first field name of a first data type and a second field name of a second data type that is different than the first data type;
   causing a set of template names to be displayed on a screen of a client device;
   wherein each template name in the set of template names (1) corresponds to a different template in a plurality of templates and (2) contains a set of text that is different relative to the set of text in each other template of the plurality of templates;
   in response to receiving first input that is separate from the plurality of field names, causing a text string to be displayed on the screen of the client device that is remote relative to the database system;
   identifying a portion of the text string;
   automatically determining that the portion is of the first data type;
   based on automatically determining that the portion is of the first data type, filtering the plurality of field names by selecting, from among the plurality of field names, a first subset of the plurality of field names that are of the first data type, wherein field names in the plurality of field names that are of a data type that is different than the first subset are not selected;

causing to be presented, on the screen of the client device, a plurality of options, each corresponding to a different field name in the first subset and including at least a portion of the different field name in the first subset;

in response to receiving second input that selects a particular option of the plurality of options, causing the portion of the text string to be transmitted over a computer network and stored in a particular field of a particular record of the database system, wherein the particular field corresponds to the particular option.

2. The one or more storage media of claim 1, wherein:
the instructions, when executed by the one or more processors, further cause receiving user input that selects the portion of the text string;
identifying the portion of the text string is performed in response to receiving the user input.

3. The one or more storage media of claim 1, wherein:
the portion is a first portion;
the instructions, when executed by the one or more processors, further cause identifying, adjacent to the first portion, a second portion of the text string;
the second portion is different than the first portion;
selecting the first subset is also based on the second portion.

4. The one or more storage media of claim 1, wherein receiving, identifying, and determining are performed by a word processor executing on the client device.

5. The one or more storage media of claim 4, wherein the word processor is a web application executing within a web browser.

6. The one or more storage media of claim 1, wherein:
causing the portion to be stored comprises sending, over the computer network to a server system, the portion and a name corresponding to the particular field;
the server system transmits, to the database system, the portion and an instruction to store the portion in the particular field of the particular record.

7. The one or more storage media of claim 6, wherein:
receiving the plurality of field names comprises receiving the plurality of field names over a network from a server system;
prior to receiving the plurality of field names, the server system receives the plurality of field names from the database system.

8. The one or more storage media of claim 6, wherein the portion is a first portion, wherein the instructions, when executed by the one or more processors, further cause:
identifying a second portion of the text string, wherein the second portion corresponds to a name of a person;
causing, to be performed, a search of the database system for a record that includes the second portion;
after causing the search to be performed, causing to be displayed, on the screen of the client device, a user interface that includes the second portion and a plurality of fields of a contact type of record in the database system.

9. One or more storage media storing instructions which, when executed by one or more processors, cause:
receiving, from a document server system, at a client device, a plurality of field names, wherein the plurality of field names corresponds to names of fields in a database system that is remote relative to the client device;

causing a set of template names to be displayed on a screen of the client device;
wherein each template name in the set of template names (1) corresponds to a different template in a plurality of templates and (2) contains a set of text that is different relative to the set of text in each other template of the plurality of templates;
causing to be displayed, at the client device, a document for entering data;
based on first user input, updating the document to include text data that is based on the first user input;
receiving second user input that selects a portion of the text data;
in response to receiving the second user input, causing an options interface to be displayed that includes a plurality of options, each corresponding to a field name in the plurality of field names and including the field name;
receiving third user input that selects a particular option of the plurality of options, wherein the particular option corresponds to a particular field name;
in response to receiving the third user input, sending, from the client device, to the document server system, the portion of the text data and the particular field name;
wherein the document server system automatically updates the database system to store the portion of the text data in a particular field, that corresponds to the particular field name, of a particular record in the database system;
a second field name in the plurality of field names is associated with a second data type that is different than the first data type.

10. The one or more storage media of claim 9, wherein receiving and causing, and determining are performed by a word processor executing on the client device.

11. The one or more storage media of claim 10, wherein the word processor is a web application executing within a web browser.

12. The one or more storage media of claim 9, wherein:
each field name in the plurality of field names is associated with a data type in a plurality of data types;
a first field name in the plurality of field names is associated with a first data type;
a second field name in the plurality of field names is associated with a second data type that is different than the first data type.

13. The one or more storage media of claim 12, wherein the instructions, when executed by the one or more processors, further cause:
identifying a second portion of the text data;
determining a particular data type of the second portion;
determining, based on the particular data type, a subset of the plurality of field names that are associated with the particular data type;
causing to be presented, on the screen of the client device, one or more options, each corresponding to a field name in the subset;
in response to receiving fourth input that selects a certain option of the one or more options, causing the second portion to be stored in a second particular field of a second particular record of the database system, wherein the second particular field corresponds to the certain option.

14. A method comprising:
receiving a plurality of field names, wherein the plurality of field names correspond to names of fields in a database system, wherein each field name in the plurality of field names is associated with a data type, wherein the plurality of field names include a first field name of a first data type and a second field name of a second data type that is different than the first data type;

causing a set of template names to be displayed on a screen of a client device;

wherein each template name in the set of template names (1) corresponds to a different template in a plurality of templates and (2) contains a set of text that is different relative to the set of text in each other template of the plurality of templates;

in response to receiving first input that is separate from the plurality of field names, causing a text string to be displayed on the screen of the client device that is remote relative to the database system;

identifying a portion of the text string;

automatically determining that the portion is of the first data type;

wherein the portion is a first portion;

identifying, adjacent to the first portion, a second portion of the text string, wherein the second portion is different than the first portion;

based on the second portion and automatically determining that the first portion is of the first data type, filtering the plurality of field names by selecting, from among the plurality of field names, a first subset of the plurality of field names that are of the first data type, wherein field names in a second subset of the plurality of field names of the second data type are not selected;

causing to be presented, on the screen of the client device, a plurality of options, each corresponding to a different field name in the first subset and including at least a portion of the different field name in the first subset;

in response to receiving second input that selects a particular option of the plurality of options, causing the first portion to be transmitted over a computer network and stored in a particular field of a particular record of the database system, wherein the particular field corresponds to the particular option;

wherein the method is performed by one or more computing devices.

15. The method of claim 14, wherein:

the method further comprising receiving user input that selects the portion of the text string;

identifying the portion of the text string is performed in response to receiving the user input.

16. The method of claim 14, wherein receiving, identifying, and determining are performed by a word processor executing on the client device.

* * * * *

UNITED STATES PATENT AND TRADEMARK OFFICE
CERTIFICATE OF CORRECTION

PATENT NO. : 11,086,884 B2
APPLICATION NO. : 15/847921
DATED : August 10, 2021
INVENTOR(S) : Baran S. Nohutcuoglu et al.

Page 1 of 1

It is certified that error appears in the above-identified patent and that said Letters Patent is hereby corrected as shown below:

In the Claims

Claim 7, Column 15, Line 42:
"The one or more storage media of claim 6" should read -- The one or more storage media of claim 1 --

Claim 8, Column 15, Line 49:
"The one or more storage media of claim 6" should read -- The one or more storage media of claim 1 --

Claim 9, Column 16, Lines 25-32:
"wherein the document server system automatically updates the database system to store the portion of the text data in a particular field, that corresponds to the particular field name, of a particular record in the database system; a second field name in the plurality of field names is associated with a second data type that is different than the first data type." should read
-- wherein the document server system automatically updates the database system to store the portion of the text data in a particular field, that corresponds to the particular field name, of a particular record in the database system. --

Signed and Sealed this
Thirty-first Day of May, 2022

Katherine Kelly Vidal
*Director of the United States Patent and Trademark Office*